US009292766B2

(12) United States Patent
Cao et al.

(10) Patent No.: US 9,292,766 B2
(45) Date of Patent: *Mar. 22, 2016

(54) TECHNIQUES FOR GROUND-LEVEL PHOTO GEOLOCATION USING DIGITAL ELEVATION

(71) Applicant: International Business Machines Corporation, Armonk, NY (US)

(72) Inventors: Liangliang Cao, Amherst, MA (US); Noel C. F. Codella, Lagrangeville, NY (US); Gang Hua, Livingston, NJ (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 13/969,783

(22) Filed: Aug. 19, 2013

(65) Prior Publication Data

US 2014/0205189 A1    Jul. 24, 2014

Related U.S. Application Data

(63) Continuation of application No. 13/744,688, filed on Jan. 18, 2013, now Pat. No. 9,165,217.

(51) Int. Cl.
*G06F 17/00* (2006.01)
*G06N 5/00* (2006.01)
*G06K 9/62* (2006.01)
*G06K 9/00* (2006.01)

(52) U.S. Cl.
CPC .......... *G06K 9/6256* (2013.01); *G06K 9/00657* (2013.01)

(58) Field of Classification Search
None
See application file for complete search history.

(56) References Cited

U.S. PATENT DOCUMENTS

| 5,652,717 | A | 7/1997 | Miller et al. |
| 7,124,149 | B2 | 10/2006 | Smith et al. |
| 8,027,541 | B2 * | 9/2011 | Hua ................... G06K 9/00228 382/118 |

(Continued)

OTHER PUBLICATIONS

Bridging the Semantic Gap for Satellite Image Annotation and Automatic Mapping Applications Bratasanu, D.; Nedelcu, I.; Datcu, M. Selected Topics in Applied Earth Observations and Remote Sensing, IEEE Journal of Year: 2011, vol. 4, Issue: 1 pp. 193-204, DOI: 10.1109/JSTARS.2010.2081349 IEEE Journals & magazines.*

(Continued)

*Primary Examiner* — Michael B Holmes
(74) *Attorney, Agent, or Firm* — Nidhi G. Kissoon; Michael J. Chang, LLC (57) ABSTRACT

Techniques for generating cross-modality semantic classifiers and using those cross-modality semantic classifiers for ground level photo geo-location using digital elevation are provided. In one aspect, a method for generating cross-modality semantic classifiers is provided. The method includes the steps of: (a) using Geographic Information Service (GIS) data to label satellite images; (b) using the satellite images labeled with the GIS data as training data to generate semantic classifiers for a satellite modality; (c) using the GIS data to label Global Positioning System (GPS) tagged ground level photos; (d) using the GPS tagged ground level photos labeled with the GIS data as training data to generate semantic classifiers for a ground level photo modality, wherein the semantic classifiers for the satellite modality and the ground level photo modality are the cross-modality semantic classifiers.

4 Claims, 4 Drawing Sheets

(56) References Cited

U.S. PATENT DOCUMENTS

| | | | |
|---|---|---|---|
| 8,112,448 | B2 | 2/2012 | Takayama et al. |
| 8,639,042 | B2 * | 1/2014 | Liu ............... G06K 9/4642 348/441 |
| 9,014,420 | B2 * | 4/2015 | Liu ............... G06K 9/00711 382/103 |
| 9,165,217 | B2 * | 10/2015 | Cao ............... G06K 9/6256 |
| 2003/0028469 | A1 * | 2/2003 | Bergman ............... G06Q 30/06 705/37 |
| 2008/0208962 | A1 | 8/2008 | Kim et al. |
| 2008/0226174 | A1 * | 9/2008 | Hua ............... G06K 9/6251 382/190 |
| 2011/0305366 | A1 * | 12/2011 | Liu ............... G06K 9/00711 382/103 |
| 2011/0311137 | A1 * | 12/2011 | Liu ............... G06K 9/4642 382/173 |
| 2014/0161360 | A1 * | 6/2014 | Cao ............... G06K 9/6202 382/218 |
| 2014/0161362 | A1 * | 6/2014 | Cao ............... G06K 9/6202 382/224 |
| 2014/0205186 | A1 * | 7/2014 | Cao ............... G06K 9/00657 382/159 |
| 2014/0205189 | A1 * | 7/2014 | Cao ............... G06K 9/00657 382/160 |

OTHER PUBLICATIONS

Operational Two-Stage Stratified Topographic Correction of Spaceborne Multispectral Imagery Employing an Automatic Spectral-Rule-Based Decision-Tree Preliminary Classifier Baraldi, A.; Gironda, M.; Simonetti, D. Geoscience and Remote Sensing, IEEE Transactions on Yr: 2010, vol. 48, Issue: 1 pp. 112-146, DOI: 10.1109/TGRS.2009.2028017.*

Automated Ice—Water Classification Using Dual Polarization SAR Satellite Imagery Leigh, S.; Zhijie Wang; Clausi, D.A. Geoscience and Remote Sensing, IEEE Transactions on Year: 2014, vol. 52, Issue: 9 pp. 5529-5539, DOI: 10.1109/TGRS.2013.2290231 IEEE Journals & Magazines.*

Information Content of Very High Resolution SAR Images: Study of Feature Extraction and Imaging Parameters Dumitru, C.O.; Datcu, M. Geoscience and Remote Sensing, IEEE Transactions on Year: 2013, vol. 51, Issue: 8 pp. 4591-4610, DOI: 10.1109/TGRS.2013.2265413 IEEE Journals & Magazines.*

L. Baboud et al., "Automatic Photo-to-Terrain Alignment for the Annotation of Mountain Pictures," 24th IEEE Conference on Computer Vision and Pattern Recognition (CVPR), pp. 41-48 (2011).

F. Stein et al., "Map-Based Localization Using the Panoramic Horizon," IEEE Transactions on Robotics and Automation, vol. 11, No. 6, pp. 892-896 (Dec. 1995).

Yan et al., "Large-Scale Multimedia Semantic Concept Modeling Using Robust Subspace Bagging and MapReduce," Proceedings of the First ACM Workshop on Large-Scale Multimedia Retrieval and Mining LS-MMRM '09, pp. 35-42, Oct. 23, 2009, Beijing, China.

R. Yan, "Transfer Learning using Task-Level Features with Application to Information Retrieval," Twenty-First International Joint Conference on Artificial Intelligence Jun. 2009.

R. Yan, "Model-Shared Subspace Boosting for Multi-label Classification," KDD '07. Aug. 12-15, 2007.

A. Natsev et al., "IBM multimedia analysis and retrieval system," ACM International Conference on Content based Image and Video Retrieval (CIVR'2008), pp. 553, 2008.

A. Natsev et al., "Semantic Concept-Based Query Expansion and Re-ranking for Multimedia Retrieval, A Comparative Review and New Approaches," Proceedings of the 15th International conference on Multimedia (Multimedia '07) pp. 991-1000, Sep. 23-28, 2007.

Codella et al., "Towards Large Scale Land-cover Recognition of Satellite Images," 2011 8th International Conference on Information, Communications and Signal Processing (ICICS), Dec. 13-16, 2011.

Codella et al., "Video Event Detection Using Temporal Pyramids of Visual Semantics with Kernel Optimization and Model Subspace Boosting," 2012 IEEE International Conference on Multimedia and Expo (ICME), Melbourne, VIC Australia, Jul. 9-13, 2012.

* cited by examiner

SEMANTIC PROBABILITY SCORE
(WHITE = HIGH)

FIG. 4B

QUERY IMAGE

FIG. 5A

DEM/SATELLITE CLASSIFICATION OVERLAY

PARALLELIZE POSSIBLE
TARGETS FOR ROUGH DRAFT

FIG. 5B

QUERY IMAGE

*FIG. 6A*

DEM/SATELLITE CLASSIFICATION OVERLAY

SILHOUETTE MATCHING ON POINTS IDENTIFIED WITH SPHERICAL CROSS-CORRELATION

*FIG. 6B*

QUERY IMAGE

*FIG. 7*

TECHNIQUES FOR GROUND-LEVEL PHOTO GEOLOCATION USING DIGITAL ELEVATION

CROSS-REFERENCE TO RELATED APPLICATION(S)

This application is a continuation of U.S. application Ser. No. 13/744,688 filed on Jan. 18, 2013, now U.S. Pat. No. 9,165,217, the disclosure of which is incorporated by reference herein.

FIELD OF THE INVENTION

The present invention relates to data analysis and mining and more particularly, to techniques for generating cross-modality semantic classifiers and using those cross-modality semantic classifiers for ground level photo geo-location using digital elevation maps augmented with satellite imagery.

BACKGROUND OF THE INVENTION

Current photo geolocation processes permit geolocation in urban and well-developed areas where many unique landmarks exist and a dense amount of photographs are taken (by tourists and residents). For example, Google Goggles, available from Google Inc., allows a user to obtain information about a famous landmark using a search based on a photograph of the landmark. For instance, the user can take a photograph of the Statue of Liberty or the Eiffel Tower and through Google Goggles can search for information on these well-known and well documented landmarks. The problem with these photo geolocation technologies is that they are not effective for remote regions where uniquely identifying features and number of photographs acquired are limited.

Current photo-to-terrain alignment processes permit registration of a ground level photograph with digital elevation maps (DEMs), if the position from which the photograph was taken is already known to within some accuracy range. See, for example, L. Baboud et al., "Automatic Photo-to-Terrain Alignment for the Annotation of Mountain Pictures," $24^{th}$ IEEE Conference on Computer Vision and Pattern Recognition (CVPR), pages 41-48 (2011) (hereinafter "Baboud"). While this technology works in remote locations, it requires geospatial coordinates of the areas from which the photographs were taken. Thus, this technology does not solve the geolocation problem described above.

Thus, improved techniques for geolocating images would be desirable.

SUMMARY OF THE INVENTION

The present invention provides techniques for generating cross-modality semantic classifiers and using those cross-modality semantic classifiers for ground level photo geo-location using digital elevation maps augmented with satellite imagery. In one aspect of the invention, a method for generating cross-modality semantic classifiers is provided. The method includes the steps of: (a) using Geographic Information Service (GIS) data to label satellite images; (b) using the satellite images labeled with the GIS data as training data to generate semantic classifiers for a satellite modality; (c) using the GIS data to label Global Positioning System (GPS) tagged ground level photos; (d) using the GPS tagged ground level photos labeled with the GIS data as training data to generate semantic classifiers for a ground level photo modality, wherein the semantic classifiers for the satellite modality and the ground level photo modality are the cross-modality semantic classifiers.

In another aspect of the invention, a method for geo-locating a query ground level photo of an unknown location from combined elevation data and satellite imagery is provided. The method includes the steps of: (a) parsing the query ground level photo into one or more semantic regions; (b) assigning semantic labels to the semantic regions; (c) using cross-modality semantic classifiers to identify geo-spatial regions in the combined elevation data and satellite imagery that have at least one semantic classifier in common with the query ground level photo; and (d) performing matches of the query ground level photo with the combined elevation data and satellite imagery for each of the geo-spatial regions identified in step (c).

A more complete understanding of the present invention, as well as further features and advantages of the present invention, will be obtained by reference to the following detailed description and drawings.

DETAILED DESCRIPTION OF PREFERRED EMBODIMENTS

Digital elevation maps (DEMs) are an essential resource for geolocating images that have been acquired in remote regions where few distinguishing characteristics present themselves. In ground-level imagery, DEM data corresponds to the ridges and valleys in the terrain. These features are robust against illumination and seasonal changes, which makes them temporally independent: an ideal characteristic for most geolocating features, especially in remote regions. Efficiently matching ground-level photos to DEM data, however, remains an open research problem. F. Stein et al., "Map-Based Localization Using the Panoramic Horizon," IEEE Transactions on Robotics and Automation, vol. 11, no. 6, pgs. 892-896 (December 1995) (hereinafter "Stein"), the contents of which are incorporated by reference herein, proposes a system which is able to localize a panoramic horizon against a DEM in approximately a minute. Stein presented only one example of localization, and their map region was only 300 $km_2$. It is unclear how well the system would scale to larger world regions and more queries with smaller fields of view.

Baboud, the contents of which are incorporated by reference herein, describes a system that is capable of determining image capture orientation given the geographical coordinates of the camera. Spherical cross correlation is computed in the fourier domain to efficiently prune the search space. Afterwards, a more accurate edge-matching algorithm is used for refinement. Drawbacks of this technique include the requirement of the initial estimated position (within several hundred meters) and the running time of two minutes per frame with GPU acceleration.

Provided herein are techniques for geolocating images using a hierarchical DEM/satellite imagery matching procedure implemented, for example, on a massively parallel Hadoop MapReduce cluster. Geo-spatial regions of low likelihood are eliminated in a hierarchical fashion, and remaining regions of higher probability are subjected to more detailed analysis. This is an improvement over previous methods by drastically improving computational efficiency, making the problem computationally feasible to compute, and eliminating the need for highly localized initial position estimates.

Exemplary embodiments of the present techniques are directed to geolocating an image of an unknown location. As will be described in detail below, cross-modality semantic modeling between ground level photo and satellite imagery is used to rule-out large areas of land that are not possibly the source of the image. An exemplary methodology 100 for generating cross-modality semantic classifiers is illustrated schematically in FIG. 1.

Figure 1:
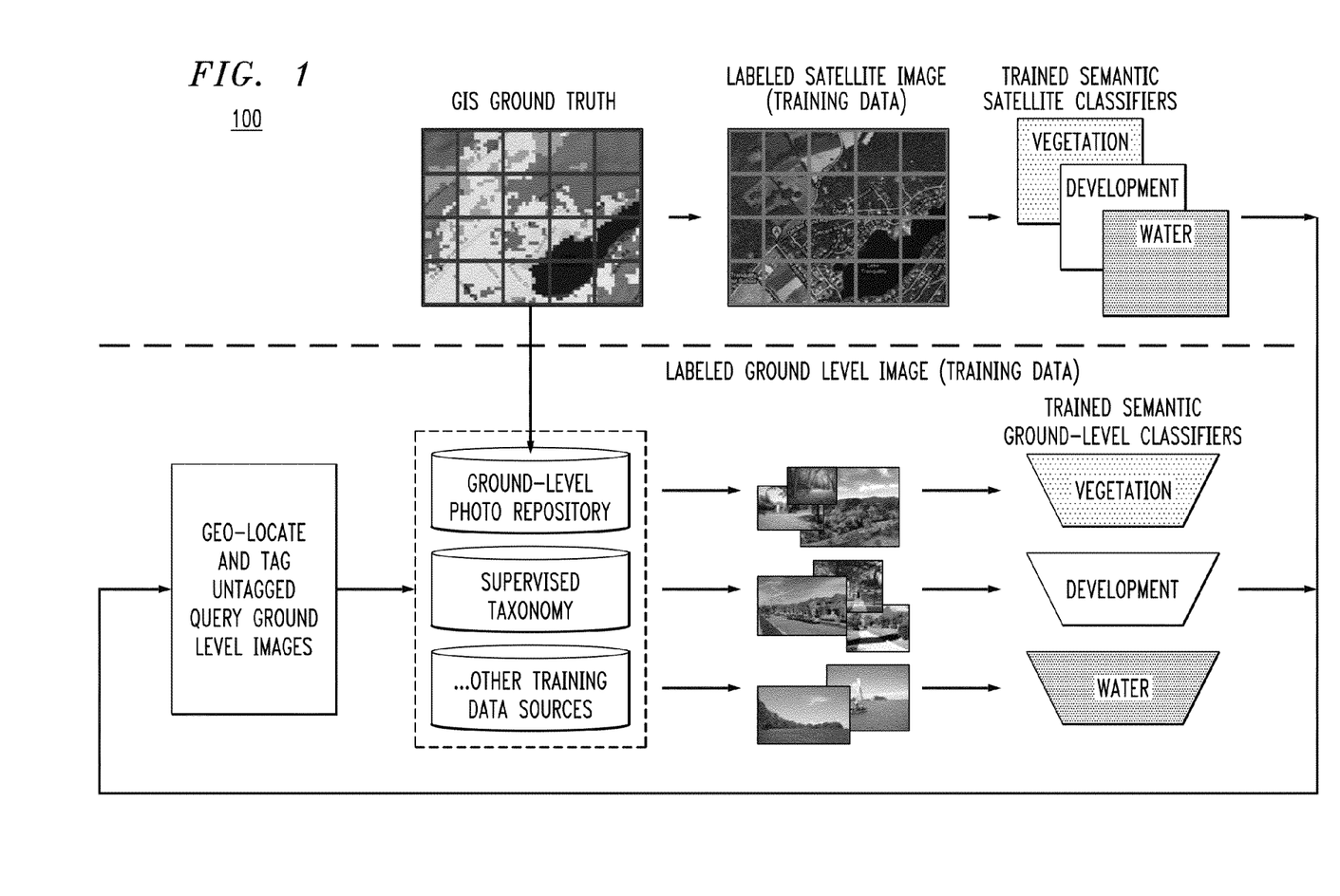
FIG. 1 is schematic diagram illustrating an exemplary process for generating cross-modality (satellite/ground level image) semantic classifiers according to an embodiment of the present invention.

As shown in FIG. 1, for the satellite modality, Geographic Information System (GIS) Ground Truth data may be used to label satellite images. For example, image data (such as satellite image data) can be read into the GIS, e.g., as a raster file or converted by the GIS into a vector data file. A raster file (such as that shown in FIG. 1 (labeled "GIS Ground Truth")) contains rows of uniform cells encoded with data values. The data values may correspond to different classifications such as VEGETATION, WATER or DEVELOPMENT. By way of example only, to convert a raster file to a vector data file, the spatial relationship of cells is taken into account, and lines can be created around cells sharing the same classification. The satellite images which serve as input data in this process are of known locations and can be obtained from publicly available databases of satellite images. As will be described in detail below, once semantic classifiers are generated from these satellite training images as well as from GPS tagged ground level images, these classifiers can then be used to geo-locate untagged query ground level images.

An exemplary process for generating semantic classifiers from image input data is described in Yan et al., "Large-Scale Multimedia Semantic Concept Modeling Using Robust Subspace Bagging and MapReduce," Proceedings of the First ACM Workshop on Large-Scale Multimedia Retrieval and Mining LS-MMRM '09, pgs. 35-42, Oct. 23, 2009, Beijing, China (hereinafter "Yan"), the contents of which are incorporated by reference herein. Yan employs a combination of forward model selection and data/feature sampling to generate semantic classifiers from the input data.

The same process is carried out to train semantic classifiers for the ground level modality. Namely, as shown in FIG. 1, GIS Ground Truth data is used to label ground level photos. According to an exemplary embodiment, the ground level photos are GPS tagged images obtained, for example, from a Ground Level Photo Repository. Specifically, the ground level photos in the repository are images of known locations (i.e., images the geolocation of which are known based on their GPS coordinates). As highlighted above, the present techniques can be used to geo-locate a ground level photo of an unknown location.

As described above, image data (such as in this case ground level image data) can be read into the GIS, e.g., as a raster file or converted by the GIS into a vector data file. A raster file contains rows of uniform cells encoded with data values. The data values may correspond to different classifications such as VEGETATION, WATER or DEVELOPMENT.

The labeled ground level photos are then used to train semantic classifiers for ground level photo modality. It is notable that, as shown in FIG. 1, other training data generation methods can optionally be used in conjunction with the GIS labeled GPS tagged ground level photos as training data to generate the semantic classifiers for the ground level modality. Other suitable training data generation methods include, but are not limited to, supervised taxonomy—whereby image labels are organized into a hierarchical tree structure that contains both mutually exclusive labels (i.e., "Car" vs. "Truck") and non-mutually exclusive labels (i.e., "Vegetation" and "Car"). As described above, by way of example only, a forward model selection process such as that described in Yan may be used to generate semantic classifiers from the input data (in this case GPS tagged ground level photos).

According to an exemplary embodiment, semantic classifiers are also created, in the same manner as described above, which contain a temporal component. That way, these temporal semantic classifiers can be used to additionally determine what time of year a query photo was taken. This capability would add a temporal component to the present geolocation process. By way of example only, this temporal classification process might involve building different classifiers for the satellite and ground level semantic modalities that include a temporal component, such as vegetation (winter), vegetation (spring), vegetation (summer), vegetation (autumn), etc. See below.

The satellite and ground level cross-modality semantic classifiers can then be used to geo-locate ground level photos without GPS information in an unstudied region of the Earth for which geospatially tagged satellite images (and perhaps other modalities, not excluding some GPS tagged ground level photos) are available. The query input in this case are untagged ground level photos meaning that the photos are ground level images of an unknown location, i.e., a location for which the GPS coordinates are unknown. By way of the process described in detail below, the query image can be geo-located and optionally annotated (i.e., labeled/tagged), for example, with GPS information. As shown in FIG. 1, once the query ground level photos are labeled/tagged, they can be added to ground level photo repository and, if so desired, the process outlined in FIG. 1 can be repeated to train the cross-modality semantic classifiers with this expanded data set.

In one non-limiting exemplary implementation of the present techniques, the steps of methodology 100 are implemented in a distributed Map-Reduce framework, such as the Apache Hadoop Distributed File System (HDFS). A Map-Reduce model for distributed processing in general involves both Map and Reduce functions for any computation. The Map function first reads a list of input key and associated values, and produces a list of intermediate ⟨key, value⟩ pairs. After grouping and shuffling intermediate pairs with the same keys, the Reduce function is applied to perform merge operations on all of the intermediate pairs for each key, and emits output pairs of ⟨key,value⟩. See, for example, Yan et al., "Large-Scale Multimedia Semantic Concept Modeling using Robust Subspace Bagging and MapReduce," LS-MMRM '09 Proceedings of the First ACM workshop on Large-scale multimedia retrieval and mining, pgs. 35-42 (October, 2009), the contents of which are incorporated by reference herein. Essentially, the MapReduce model transforms a plurality of ⟨key, value⟩ pairs into a list of values. The input and output ⟨key,value⟩ pairs can have different formats. The Map function can be performed in parallel on non-overlapping data partitions. The Reduce function can be performed in parallel on intermediate pairs with the same keys. The Map-Reduce framework may be embodied in an apparatus, such as apparatus 700 shown in FIG. 7, described below.

Figure 2:
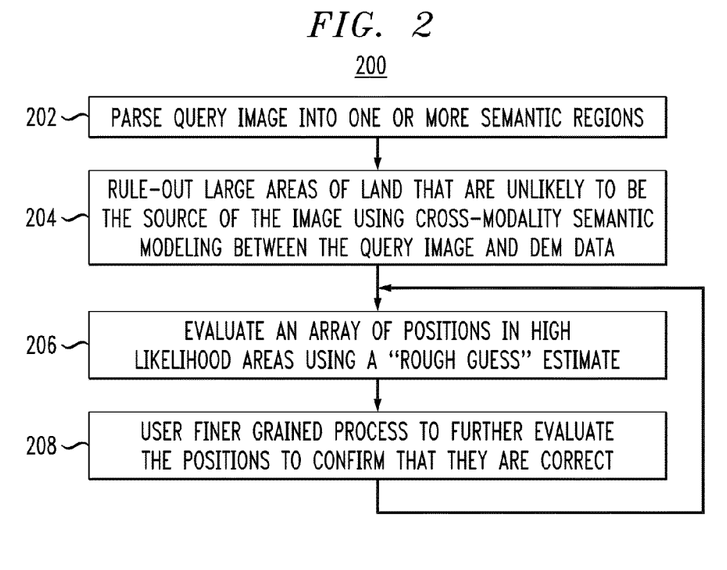
FIG. 2 is a diagram illustrating an exemplary methodology for geolocating a ground level photo of an unknown location from combined elevation data and satellite imagery according to an embodiment of the present invention.

An exemplary embodiment (methodology 200) for using the above-generated cross-modality (satellite and ground level) semantic classifiers to geo-locate untagged ground level photos is now described by way of reference to FIG. 2. The inputs to methodology 200 are i) the cross-modality semantic classifiers generated, for example, as described in conjunction with the description of FIG. 1, above, ii) one or more query ground level photos of an unknown location and iii) combined elevation data and satellite imagery. According to an exemplary embodiment, the combined elevation data/satellite imagery is obtained simply by overlaying digital elevation map (DEM) data onto satellite images. See, for example, FIG. 3A (described below) wherein this classification data (i.e., the data which will be used to classify/geo-locate the query image) is labeled "DEM/satellite classification overlay." The satellite imagery component of the classification data will be used for semantic classification (i.e., the cross-modality semantic classifiers will be applied to the satellite imagery components of the classification data), and the elevation (e.g., DEM) data component of the classification data will be used for image orientation alignment. Both of these aspects will be described in detail below. Thus, each pixel in the combined elevation data and satellite imagery contains the standard RGB color value (satellite imagery data) as well as an elevation value (topography). The terms "classification data" and "combined elevation data and satellite imagery" will be used synonymously and interchangeably throughout the present description.

Basically, the present process uses the cross-modality semantic classifiers to "coarsely" match the query ground level image with the combined elevation data and satellite imagery based on the query photo and the combined elevation data and satellite imagery sharing the same visual semantic content. Following that coarse matching, more fine-grained comparisons are then made between the query image and the combined elevation data and satellite imagery using image orientation alignment procedures. As described above, the query photo(s) in this case are untagged images meaning that the location(s) of the photo(s)—by way of GPS coordinates—is/are unknown. It is further noted that, as provided above, the query images, once geo-located and tagged/labeled using the present process can be fed back into the system and used as training data for refining the cross-modality semantic classifier generation process outlined above. DEM data is readily available, for example, from the U.S. Geological Survey (USGS). As is known in the art, the DEM data contains detailed geospatial information.

In step 202, each query ground level photo (image—wherein the terms "photo" and "image" are being used interchangeably herein) is parsed into one or more different semantic regions (i.e., regions of different semantic attributes) and semantic labels are assigned to the semantic regions. In one exemplary embodiment, IMARS-based semantic classifiers are used to label the query photo(s). IMARS—the IBM Multimedia Analysis and Retrieval System—is a system that can be used to automatically index, classify, and search large collections of digital images and videos. IMARS works by analyzing visual features of the images and videos, and subsequently allows them to be automatically organized and searched based on their visual content. IMARS includes the IMARS extraction tool and the IMARS search tool. The IMARS extraction tool takes a collection of images and videos from the user, and produces indexes based on mathematical analyses of each piece of content. These indexes organize the results of the analyses for the IMARS search tool. IMARS also permits users to define categories. Thus, the processing of the query image/reference images, e.g., through IMARS, can permit user interaction. IMARS is further described, for example, in A. Natsev et al., "IBM multimedia analysis and retrieval system," ACM International Conference on Content based Image and Video Retrieval (CIVR'2008), pp. 553-554, 2008 (hereinafter "Natsev"), the contents of which are incorporated by reference herein.

Figure 3A:
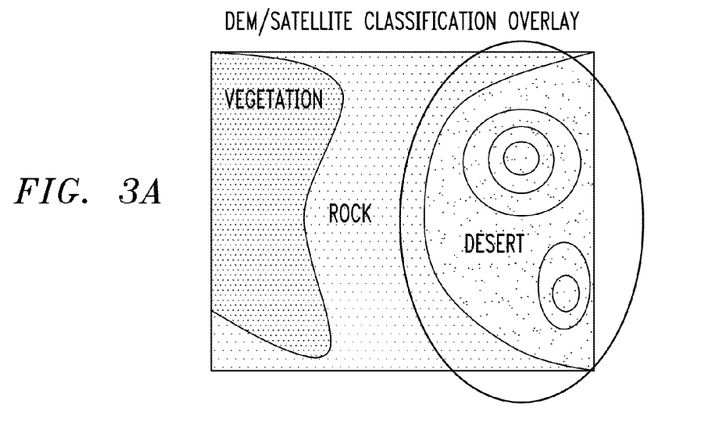
FIG. 3A is a schematic diagram illustrating an exemplary combination of elevation data and satellite imagery according to an embodiment of the present invention.

The types of semantics labels can include, but are not limited to, "ROCK," "SAND," "DESERT," "VEGETATION," etc.—just to provide a few examples of IMARS-based semantic labels/classifiers. Of course, this is not an exhaustive list of all of the possible semantic classifiers, but is being provided merely to illustrate what kinds of semantic classifiers might be used. Exemplary semantic classifiers that may be used herein to label the semantic regions in the images are provided in U.S. Pat. No. 7,124,149 issued to Smith et al., entitled "Method and Apparatus for Content Representation and Retrieval in Concept Model Space" (hereinafter "U.S. Pat. No. 7,124,149"), the contents of which are incorporated by reference herein. See for example FIG. 3 (described below), wherein the query ground level image has been assigned the semantic label "DESERT."

In general, methodology 200 operates by performing successively more fine-grained matching between the query ground level image and the combined elevation data and satellite imagery using the cross-modality semantic classifiers generated above to come up with a list of potential matches between one or more geo-spatial regions in the combined elevation data and satellite imagery and the query image. As provided above, the combined elevation data and satellite imagery contains geo-spatial location information. Thus, by matching the query image to the combined elevation data and satellite imagery, the geo-spatial location of the query image can be ascertained.

The combined elevation data and satellite imagery may be parsed into geo-spatial regions labeled with associated semantic content extracted by use of the classifiers. For instance, as described above, the combined elevation data and satellite imagery can be read into a geospatial system such as GIS, e.g., as a raster file or converted by the GIS into a vector data file. A raster file contains rows of uniform cells encoded with data values. The data values may correspond to different geo-spatial regions such as VEGETATION, WATER or DEVELOPMENT. An example of combined elevation data and satellite imagery parsed into different geo-spatial regions labeled with semantic classifiers is shown, e.g., in FIG. 3A (described below).

Parsing the query image into semantic labeled regions provides an efficient way to initially rule out large areas in the combined elevation data and satellite imagery that do not have matching semantic regions with the query image. Namely, in step 204, the method first eliminates large areas of land in the combined elevation data and satellite imagery which are unlikely sources of the query image. At the outset, all of the geo-spatial regions in the combined elevation data and satellite imagery represent potential candidate locations for the query image. In step 204, the geo-spatial regions in the combined elevation data and satellite imagery are matched with the query image based on one or more criteria, such as the geo-spatial regions in the combined elevation data and satellite imagery and the query image having the at least one semantic region in common. Based on this first (course-grained) matching the combined elevation data and satellite imagery can be ranked based on the probability of its being a match for the query image.

The cross-modality semantic classifiers (generated, for example, as provided above) are employed in this coarse matching step. Basically, since the semantic classifiers apply across different modalities (i.e., across ground level and satellite image modalities) they permit matching semantic regions present in the ground level query image with the satellite imagery in the classification data (i.e., in the combined elevation data and satellite imagery). The elevation data (e.g., DEM data) (i.e., in the combined elevation data and satellite imagery) will be used later in the process to make more fine-grained matches in a pruned list of possible matching geo-spatial regions. This matching using the semantic classifiers serves to prune the list of potential matches.

In one non-limiting exemplary implementation of the present techniques, the steps of methodology 200 are implemented in a distributed Map-Reduce framework, such as the Apache Hadoop Distributed File System (HDFS). A Map-Reduce model for distributed processing in general involves both Map and Reduce functions for any computation. The Map function first reads a list of input key and associated values, and produces a list of intermediate ⟨key,value⟩ pairs. After grouping and shuffling intermediate pairs with the same keys, the Reduce function is applied to perform merge operations on all of the intermediate pairs for each key, and emits output pairs of ⟨key,value⟩. See, for example, Yan et al., "Large-Scale Multimedia Semantic Concept Modeling using Robust Subspace Bagging and MapReduce," LS-MMRM '09 Proceedings of the First ACM workshop on Large-scale multimedia retrieval and mining, pgs. 35-42 (October, 2009), the contents of which are incorporated by reference herein. Essentially, the MapReduce model transforms a plurality of ⟨key,value⟩ pairs into a list of values. The input and output ⟨key,value⟩ pairs can have different formats. The Map function can be performed in parallel on non-overlapping data partitions. The Reduce function can be performed in parallel on intermediate pairs with the same keys. The Map-Reduce framework may be embodied in an apparatus, such as apparatus 700 shown in FIG. 7, described below.

Figure 3B:
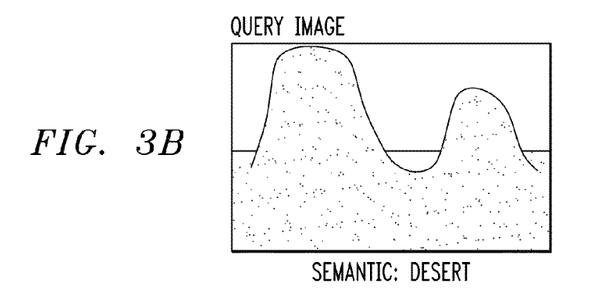
FIG. 3B is a schematic diagram illustrating an exemplary query ground level image according to an embodiment of the present invention.

Step 204 of methodology 200 is illustrated schematically in FIGS. 3 and 4. Specifically, FIG. 3A is a schematic diagram illustrating exemplary combined elevation data and satellite imagery and FIG. 3B is a schematic diagram illustrating an exemplary query ground level image. As described above, the combined elevation data and satellite imagery can be encoded with data values which correspond to different geo-spatial regions such as in this case VEGETATION, ROCK and DESERT. As described above, in FIG. 3A, the classification data (i.e., the combined elevation data and satellite imagery) is labeled "DEM/Satellite Classification Overlay" which means that a dataset is employed where each pixel not only has the standard RGB color values (satellite imagery) but also an elevation value—as described above. The present process seeks to find coarse matches between these geo-spatial regions in the combined elevation data and satellite imagery and the query image using the present cross-modality semantic classifiers.

According to an exemplary embodiment, step 204 is performed to produce a list of potential matches of geo-spatial regions in the combined elevation data and satellite imagery and the query image based on a geo-spatial region in the combined elevation data and satellite imagery and the query image having at least one semantic region in common. According to an exemplary embodiment, the matches in the list are ranked. For instance, a score is produced which is determined by how similar the semantic labeled regions are. All of the classification data (i.e., the combined elevation data and satellite imagery) is then ranked against the query image by this score. The scores are determined relatively. The method to evaluate the combined elevation data and satellite imagery produces an absolute, unit-less score. Probability of a match is measured by how high this score is relative to its peers, i.e., (score−lowest score)/(highest score−lowest score). If all the classification data (i.e., combined elevation data and satellite imagery) are "ranked," relative to each other in terms of their "score," then those with a higher rank are more likely matches than those on the list with a lower rank. Thus, the list ranks the possible matches by probability. To use a simple example, a geo-spatial region in the classification data with one semantic region in common with the query image would have a higher probability score than a region(s) in the classification data that has no semantic regions in common with the query image. Likewise, those regions in the classification data having more than one semantic region in common with the query image would have a higher probability score than regions with only a single matching semantic classifier, and so on. According to an exemplary embodiment, the regions of the classification data that have no semantic regions in common with the query image are eliminated from further consideration in step 204.

As shown in FIG. 3B, the query ground level image in this case has been parsed (see above) into one semantic labeled region, namely DESERT. One geo-spatial region in the combined elevation data and satellite imagery of FIG. 3A is circled to indicate that the encircled geo-spatial region has at least one semantic region in common with the query image. It is notable that the scenario being shown is only an elementary example to illustrate the present techniques, and more complicated scenarios are of course envisioned where for instance the query image contains multiple semantic regions and the geo-spatial regions of the combined elevation data and satellite imagery have varying numbers of matching semantic classifiers with the query image. By way of example only, the query image might contain the semantic regions DESERT and ROCK. Further there might be a geo-spatial region in the combined elevation data and satellite imagery that contains the semantic region DESERT and another that contains both the semantic regions DESERT and ROCK. The geo-spatial region of the combined elevation data and satellite imagery containing both semantic classifiers in common with the query image would thus have a higher ranking score than that region with only one match in common (or those with no matches in common).

As highlighted above, based on this initial course-grained matching in step 204 the geo-spatial regions in the combined elevation data and satellite imagery can be ranked. The ranking is based on the probability that classification (i.e., combined elevation data and satellite imagery) data is a match for the query image. By way of this ranking, the process can focus on those classification data with a high probability of being a potential match with the query image, thus greatly reducing the amount of data to be processed. See for example FIGS. 4A and 4B.

Figure 4A:
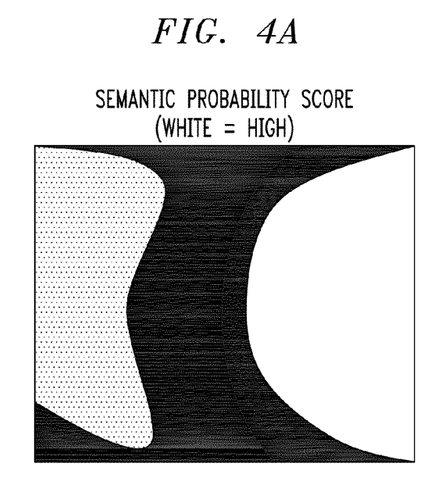
FIG. 4A is a schematic diagram illustrating the exemplary combined elevation data and satellite imagery from FIG. 3A having been ranked based on the cross-modality semantic classifiers according to an embodiment of the present invention.
Figure 4B:
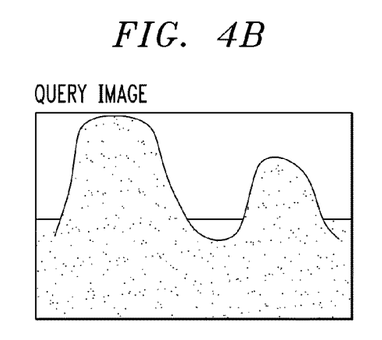
FIG. 4B is a schematic diagram illustrating the exemplary query ground level image according to an embodiment of the present invention.

Specifically, FIG. 4A is a schematic diagram illustrating the exemplary combined elevation data and satellite imagery data (from FIG. 3A) having been ranked based on the above-described course grain matching using the cross-modality semantic classifiers. A shown in FIG. 4A, the high probability regions (based on the labeled semantic regions probability score—described above) are shown in white. Regions of lower probability are shown in grey and areas of lowest probability of a match to the query image are shown in black. At this stage, the probability is solely determined by similarity of semantic content between the combined elevation data and satellite imagery regions and the ground level photo. Similarity may be defined by a metric, such as the L2 distance between semantic model vectors, where each element of the vector is the resultant score from each of the cross-modality semantic classifiers. For comparison, the query image is shown adjacent to FIG. 4A in FIG. 4B.

Referring back to FIG. 2, the next step in methodology 200 is to perform matching of the query image with the combined elevation data and satellite imagery data within candidate geo-spatial regions with similar semantic content. Specifically, the focus will now be centered on those regions of higher probability from the step 204 matching and a more fine-grained matching process will be performed on those areas. The goal here is to take the ranked list of candidate matches from step 204 wherein the ranking is based on a probability score—as described above, and refine the scoring using a more fine-grained focus on those regions of higher ranking in the list. This more fine-grained analysis (of higher probability matching regions) involves the elevation data (e.g., DEM data) component of the classification data. As will be described in detail below, for those "coarse" matching regions (based, for example, on the (cross-modality) semantic classification matches between the satellite imagery component and the query ground level image) image orientation alignment will now be performed for horizon matching.

According to one exemplary embodiment, this more fine-grained analysis is performed in multiple steps. Namely, in step 206, an array of positions is evaluated in high likelihood areas, i.e., high probability geo-spatial regions of the combined elevation data and satellite imagery data (those regions identified in step 204).

It is notable that what specific regions of the combined elevation data and satellite imagery data are selected for this fine-grained analysis are likely application-specific. For instance, as described above, the ranking of matches between the combined elevation data and satellite imagery data and the query image is based on the number of semantic regions a match has in common. The "high-probability" matches would be those that have the most number of semantic regions in common. Using the example provided above where the query image has two semantic regions DESERT and ROCK, the more fine-grained analysis may be performed for only those regions in the combined elevation data and satellite imagery data that contain both classifiers DESERT and ROCK. However, if the number of regions in the combined elevation data and satellite imagery data containing both DESERT and ROCK classifiers is small or non-existent, then in order to broaden the potential pool of candidates, it may be desirable to expand the fine-grained analysis to regions of the combined elevation data and satellite imagery data containing only one classifier in common with the query image, i.e., DESERT and/or ROCK. This determination would be within the capabilities of one skilled in the art given the teachings presented herein.

The sampling density of the array of positions is selected to be proportionate with the surrounding regions probability score output in step 204. In such a manner, the method chooses to spend more computational resources looking for an exact location match in areas that are highly probable, and spends less time in areas that are less probable, as determined by the semantic matching. Therefore, the sampling density in units of samples per square kilometer (km) may be a function of a constant "c" multiplied by the probability "p." The constant is a value that can be determined empirically, and may vary depending on how complex the characteristics of the surrounding region of interest happen to be. For the purposes of the present techniques, the constant is chosen as 100 (a 10×10 grid). The probability "p" may be determined by the proportion of uniquely matching semantics, scaled by the total number of observed semantics in both query and test regions.

According to an exemplary embodiment, step 206 is performed by using a fast "rough guess" process to make a likelihood estimate for each position in each of the arrays. By way of example only, step 206 can involve a spherical vector cross-correlation mapping between processed edges on the query image and the topography/elevation component of the classification data. See for example Baboud, the contents of which are incorporated by reference herein. Baboud provides a detailed process for integrating edge orientations in cross-correlation mapping, wherein the orientation information is represented as a 2D real-valued vector field. See, for example, FIG. 8 of Baboud. Baboud describes cross-correlation between images using the fast fourier transform (FFT) and how edge orientations can be integrated into that process using an angular similarity operator.

As provided above, the present process can be implemented in a distributed Map-Reduce framework, such as the Apache Hadoop Distributed File System. Positions will be organized as Hadoop "jobs" with a priority initially ranked by the probability scores assigned in step 204. Both the spherical cross correlation technique and subsequent edge-matching methods have associated search space resolutions. See Baboud. The present technique will start off with a very coarsely grained angular search space, using only spherical cross correlation, and produce a score proportionate with the probability that the position is a match to the image. Based on step 206, processed positions will be resubmitted to the Hadoop Job queue with an updated priority value that is proportionate with the new score.

Figure 5A:
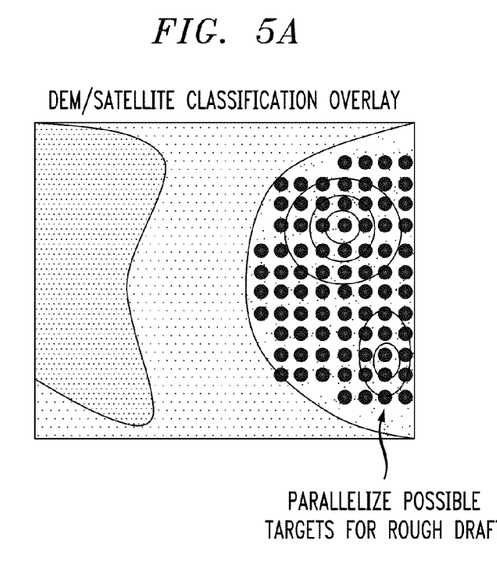
FIG. 5A is a schematic diagram illustrating the evaluation of an array of positions in a geo-spatial region of the combined elevation data and satellite imagery from FIG. 3A which received a high semantic probability score according to an embodiment of the present invention.
Figure 5B:
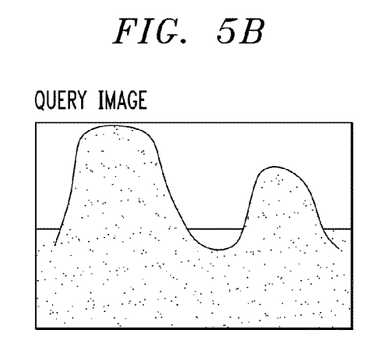
FIG. 5B is a schematic diagram illustrating the exemplary query ground level image according to an embodiment of the present invention.

Step 206 of methodology 200 is illustrated schematically in FIG. 5. Specifically, FIG. 5A is a schematic diagram illustrating evaluation of an array of positions in a geo-spatial region of the combined elevation data and satellite imagery data which in step 204 received a high semantic probability score (see FIG. 4A). Techniques for determining sampling density of the array were provided above. For comparison, the query image is shown adjacent to FIG. 5A in FIG. 5B.

The result from the "rough guess" process in step 206 is a likelihood estimate for each of the positions in the array. These estimates can be used to create a list that ranks each of the positions in the array. For instance, a relative score can be assigned to each of the positions in the array based on their estimated likelihood of being a match to the query image. This scoring process was described in detail above. Namely, if all the positions are "ranked," relative to each other in terms of their "score," then those with a higher rank are more likely matches than those with a lower rank. Thus, the list ranks the possible matches by probability. Now, a finer-grained process can be used to evaluate the positions to determine and confirm whether the score determined in step 206 is correct. For instance, while the "rough guess" estimate performed in step 206 is relatively fast, it may contain inaccuracies. See for example Baboud.

Thus, referring back to FIG. 2, the next step in methodology 200 is to use a slower, more accurate matching process to further evaluate the positions in the array to refine the geo-location estimate. See step 208. Again the topography/elevation component of the classification data will be used in this step. The input to step 208 is the array of positions having an updated priority value that is proportionate to the score determined in step 206. In step 208, the positions in the array are then evaluated (using the finer-grained process) according to their score in the ranking, with the higher probability score positions being processed before the lower probability score positions. As shown in FIG. 2 the process is iterative. For example, if by way of step 208 it is determined that one or more of the estimations made in step 206 are incorrect, then steps 206 and 208 can be repeated in an iterative manner. By way of example only, as provided above, the "rough guess" estimate from step 206 produces a ranking of the positions. The determination that one or more of the estimates is incorrect (and thus another iteration is needed) can be based on if, after performing the more fine-grained process in step 208, the ranking of the positions has changed. This might indicate that there was an inaccuracy in the "rough guess" process. Therefore, the process reverts back to step 206 in an iterative manner until no inaccuracies in the estimations are detected. It is notable that in further iterations, the ranking might change once these inaccuracies are detected and corrected, thus the priority of the positions evaluated might similarly change from one iteration to the next. By performing the process by way of steps 206 and 208 provides the best of both worlds in terms of processing efficiency (step 206) and accuracy (step 208).

According to an exemplary embodiment, step 208 is performed using a silhouette map matching process, such as that described in Baboud. According to Baboud, a feasible silhouette map can contain T-junctions, but no crossings. Crossings appear only in singular views, when two distinct silhouette edges align. See FIG. 4 of Baboud. The techniques in Baboud overcome the inaccuracies associated with conventional edge-detection techniques due, for example, to noisy edges.

As provided above, the present process can be implemented in a distributed Map-Reduce framework, such as the Apache Hadoop Distributed File System. As provided above, steps 206 and 208 are iterative, whereby evaluations are further refined each time a position is resubmitted to the Hadoop Job queue. Either finer resolutions are chosen for Baboud's alignment method to attain a more accurate matching, or the more precise edge matching process (e.g., silhouette map matching) described by Baboud is selected. If the finer resolutions and more precise edge matching produce less-exact matches than more coarse matching methods, the geospatial location will receive a lower rank, and thus lower its priority for further evaluation. Methodology 200 may also be adjustable by the end-user: such as by using a threshold ranking confidence level chosen by the user (i.e. return top "n" matches, e.g., top 100 matches).

Figure 6A:
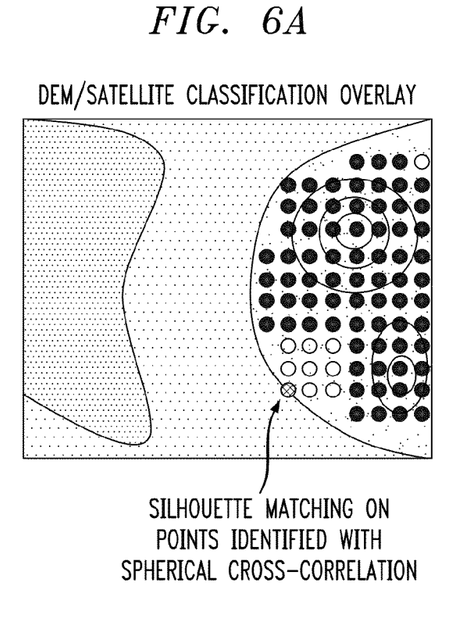
FIG. 6A is a schematic diagram illustrating "rough-guess" silhouette matching having been performed on points identified using cross-correlation according to an embodiment of the present invention.
Figure 6B:
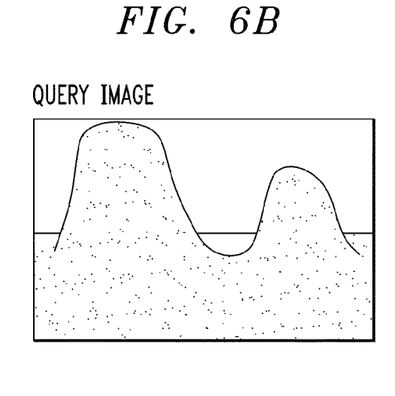
FIG. 6B is a schematic diagram illustrating the exemplary query ground level image according to an embodiment of the present invention.

Step 208 of methodology 200 is illustrated schematically in FIG. 6. Specifically, FIG. 6A is a schematic diagram illustrating "rough guess" silhouette matching having been performed on points identified in step 206 (e.g., using cross-correlation). In this example the finer-grained silhouette matching is being performed on the positions in the array with white shading, and the true correct results are shown in gray. Basically, these are geospatial coordinates to be fed to Baboud's method for "rough-guess" scene alignment between the classification data and the ground level photograph (locations shown in black). If the scene alignment is good, this constitutes a good match. Each geospatial position evaluated is returned in a ranked list based on how good the matching was. The better matching positions are chosen for a finer matching process to confirm the results (locations shown in white). The "correct" match is shown in gray, among the white locations. For comparison, the query image is shown adjacent to FIG. 6A in FIG. 6B.

The results of methodology 200 will be a list of candidate combined elevation data and satellite imagery data matches for the query ground level image. This list can be presented to the user along with the probability scores. It is then up to the user as to what they want to do with the results. The user might simply want to have a list of potential matches. For instance if the user is searching for geo-location matches for a query image, he/she might simply want a list of potential matches which the user can then further prune based on other factors not taken into consideration here such as specific landmarks, foliage, etc.

The user may also wish to supplement ground-level photo semantic classifiers with data resulting from correctly annotated query ground level photo(s). For instance, if the user finds a match between the query photo and the combined elevation data and satellite imagery data, then the user might annotate (tag/label) the query image with the GPS coordinates (or any other useful data) of the location. As described above, these now-tagged query images may be added to the pool of GPS tagged ground level images used to generate the cross-modality semantic classifiers—thus expanding the training set.

If multiple regions are identified by semantic matching with a probability greater than zero, then each region is sampled at a density linearly proportionate with the probability assigned to that region according to the proportion of matching semantics. Each sample is evaluated using Baboud's method for a "rough-guess" scene alignment.

As highlighted above, the present techniques may be further adapted to infer time of year (season) in which a query ground-level photo was taken, as follows: As in the process depicted in FIG. 1 for creating ground level semantic classifiers for particular geospatial coordinates, the geospatial queries can be augmented with terms that specify the time of year, such as "spring," "summer," "autumn" (fall), and "winter." For each cross-modality semantic classifier generated previously (such as "vegetation" or "water"), 4 new additional semantic classifiers will thus be generated for each particular season of the year (such as "vegetation winter," "vegetation spring," or "water summer").

Figure 7:
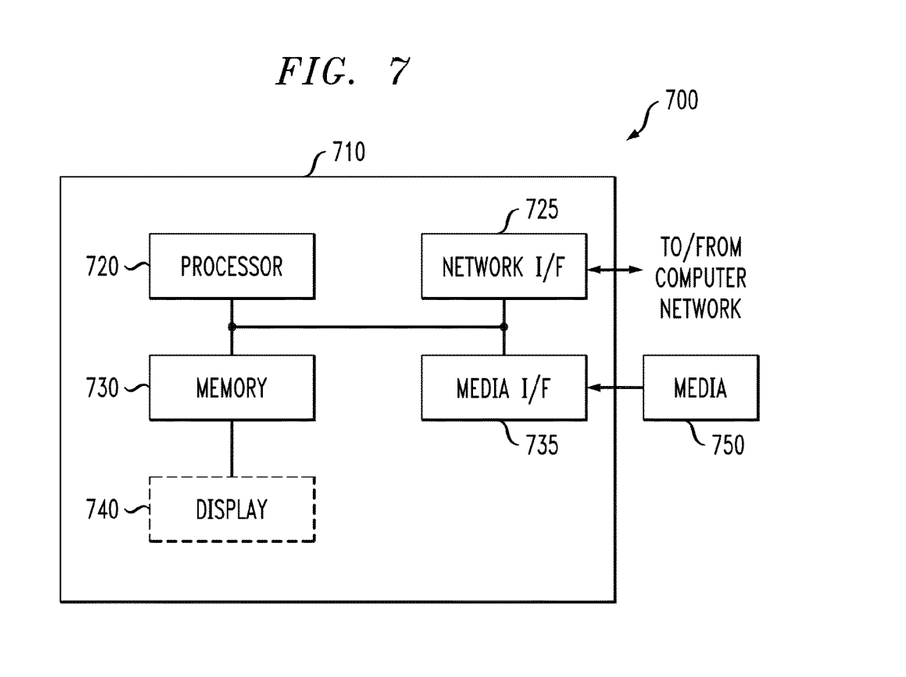
FIG. 7 is a diagram illustrating an exemplary apparatus for performing one or more of the methodologies presented herein according to an embodiment of the present invention.

Turning now to FIG. 7, a block diagram is shown of an apparatus 700 for implementing one or more of the methodologies presented herein. By way of example only, apparatus 700 can be configured to implement one or more of the steps of methodology 100 of FIG. 1 for generating cross-modality semantic classifiers and/or the methodology 200 of FIG. 2 for geo-locating a query ground level photo of an unknown location from combined elevation data and satellite imagery.

Apparatus 700 comprises a computer system 710 and removable media 750. Computer system 710 comprises a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

As is known in the art, the methods and apparatus discussed herein may be distributed as an article of manufacture that itself comprises a machine-readable medium containing one or more programs which when executed implement embodiments of the present invention. For instance, when apparatus 700 is configured to implement one or more of the steps of methodology 100 the machine-readable medium may contain a program configured to (a) use GIS data to label satellite images; (b) use the satellite images labeled with the GIS data as training data to generate semantic classifiers for a satellite modality; (c) use the GIS data to label GPS tagged ground level photos; (d) use the GPS tagged ground level photos labeled with the GIS data as training data to generate semantic classifiers for a ground level photo modality, wherein the semantic classifiers for the satellite modality and the ground level photo modality are the cross-modality semantic classifiers.

When apparatus 700 is configured to implement one or more of the steps of methodology 200 the machine-readable medium may contain a program configured to (a) parse the query ground level photo into one or more semantic regions; (b) assign semantic labels to the semantic regions; (c) use cross-modality semantic classifiers to identify geo-spatial regions in the combined elevation data and satellite imagery that have at least one semantic classifier in common with the query ground level photo; and (d) perform matches of the query ground level photo with the combined elevation data and satellite imagery for each of the geo-spatial regions identified in step (c).

The machine-readable medium may be a recordable medium (e.g., floppy disks, hard drive, optical disks such as removable media 750, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. An apparatus for generating cross-modality semantic classifiers, the apparatus comprising:
   a memory; and
   at least one processor device, coupled to the memory, operative to:
   (a) use Geographic Information Service (GIS) data to label satellite images;
   (b) use the satellite images labeled with the GIS data as training data to generate semantic classifiers for a satellite modality;
   (c) use the GIS data to label Global Positioning System (GPS) tagged ground level photos; and
   (d) use the GPS tagged ground level photos labeled with the GIS data as training data to generate semantic classifiers for a ground level photo modality,
   wherein the semantic classifiers for the satellite modality and the ground level photo modality are the cross-modality semantic classifiers.

2. An apparatus for geo-locating a query ground level photo of an unknown location from combined elevation data and satellite imagery, the apparatus comprising:
   a memory; and
   at least one processor device, coupled to the memory, operative to:
   (a) parse the query ground level photo into one or more semantic regions;
   (b) assign semantic labels to the semantic regions;
   (c) use cross-modality semantic classifiers to identify geo-spatial regions in the combined elevation data and satellite imagery that have at least one semantic classifier in common with the query ground level photo; and
   (d) perform matches of the query ground level photo with the combined elevation data and satellite imagery for each of the geo-spatial regions identified in step (c).

3. The apparatus of claim 2, wherein IMARS-based semantic classifiers are used to label the semantic regions.

4. The apparatus of claim 2, wherein the at least one processor device is further operative to:
   (h) generate the cross-modality semantic classifiers by i) using GIS data to label satellite images; ii) using the satellite images labeled with the GIS data as training data to generate semantic classifiers for a satellite modality; iii) using the GIS data to label GPS tagged ground level photos; and iv) using the GPS tagged ground level photos labeled with the GIS data as training data to generate semantic classifiers for a ground level photo modality, wherein the semantic classifiers for the satellite modality and the ground level photo modality are the cross-modality semantic classifiers.

* * * * *